P. BURGER.
STONE CUTTING MACHINE.
APPLICATION FILED SEPT. 26, 1911.
1,081,576.
Patented Dec. 16, 1913.
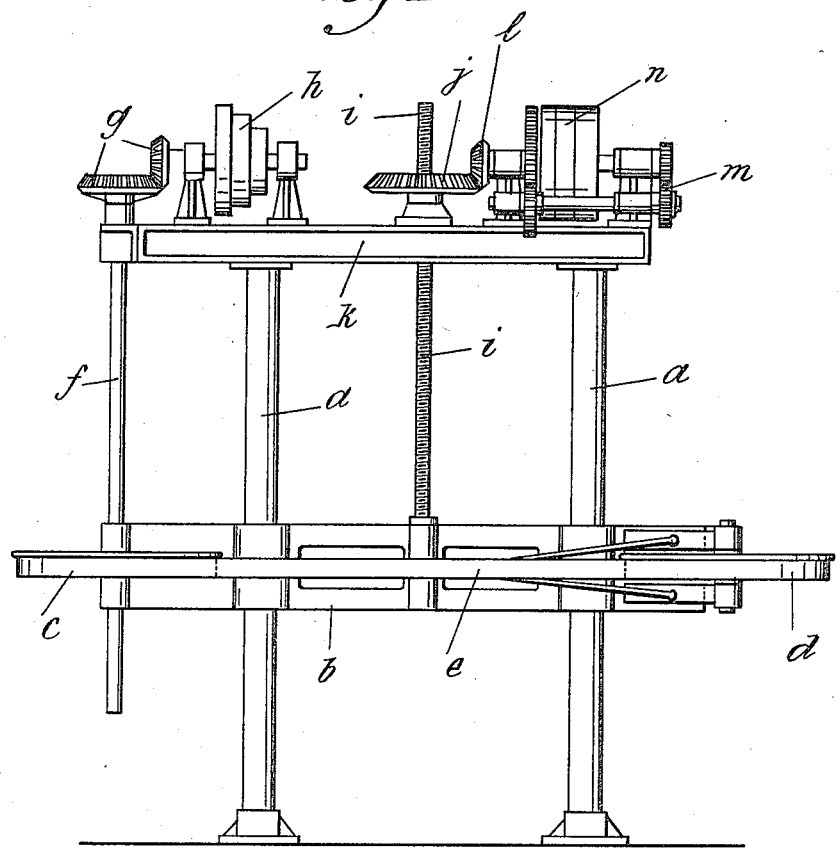
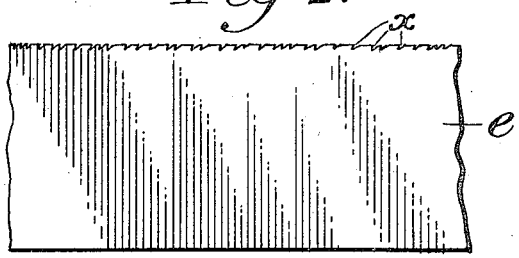

UNITED STATES PATENT OFFICE.

PAUL BURGER, OF BAUMHOLDER, GERMANY.

STONE-CUTTING MACHINE.

1,081,576. Specification of Letters Patent. Patented Dec. 16, 1913.

Application filed September 26, 1911. Serial No. 651,429.

*To all whom it may concern:*

Be it known that I, PAUL BURGER, doctor, engineer, and manufacturer, a subject of the German Emperor, and resident of Baumholder, in the Government District of Trier and the Kingdom of Prussia, Germany, with post-office address Hauptstrasse 245, have invented new and useful Improvements in Stone-Cutting Machines, of which the following is a specification.

The blocks of eruptive or sedimentary stone which are used as building stones, tombstones and the like, have hitherto usually been cut by means of large tools resembling frame saws for wood, in which a smooth steel or iron band serves as the cutting blade being fed with granular iron (steel sand, sharp sand or the like mixed with water). Such machines have quite considerable, although limited dimensions, and necessitates in consequence of their large reciprocating masses much expenditure of power; they also require continuous attention, since the cutting medium must be continuously fed by hand. They operate with a very broad cut involving considerable loss of material, and to saw through large blocks necessitates much time for, in granite for example, the progress attained is at most 5 centimeters per hour. Moreover, the cut surfaces are very rough, so that several successive polishing operations are required, entailing further cost and loss of time.

Material which is attacked by rust, such as marble, lime-stone or the like cannot be sawed with steel sand, which is the best cutting medium hitherto known, so that the considerably slower working quartz sand must be used.

I have now found that a device which is used in the home industry of cutting small precious and half precious stones for jewelry is also applicable for dividing large blocks of stone which are non-homogeneous in respect of hardness. In the jewelry industry, which deals only with completely homogeneous material, there are used small thin iron disks having notches in their periphery in which diamond dust mixed with oil is rubbed and is held by partial closing of the notches. Similarly prepared disks have already been used for cutting glass which also is a completely homogeneous material in respect of hardness.

According to the present invention a cutting tool is used which is prepared in the aforesaid known manner at its cutting edge, that is to say this edge is provided with notches in close proximity to each other and in these notches fine diamond dust mixed with oil is rubbed whereupon the notches are partly closed again by application of a stone which has the effect of upsetting the edges of the notches, thereby anchoring the comminuted abrading material in the notches and preventing said material being displaced. A tool as thus constructed presents a relatively thin operating edge on which the comminuted abrading material is securely held in the closely spaced notches, to afford a practically continuous cutting edge of abrading material which makes incisions in the stone but little wider than the said edge and leaves the incisions with comparatively smooth even surfaces that require little subsequent treatment to finish and polish. Since in the industry of cutting precious stones care is always taken that only the same material is cut with the same disk in order to avoid blunting the disk, it is all the more surprising that, as I have found, even blocks of stone of irregular structure in respect of hardness, like granite, porphyry, diabas, marble and the like, can be cut without any other provision by means of such a cutting tool.

The cut surfaces produced by the tool are quite smooth (finely ground) so that the usually necessary further operations for preparing the surface for polishing are avoided and the surfaces can be directly polished. Moreover, the breadth of the cut is extremely small so that the loss of material is hardly appreciable.

A further advantage in the use of such a tool resides in the fact that the speed of cutting, even in the case of a very hard stone, is considerably greater than is the case with the old stone saw. Moreover, the edges of a stone cut in this manner are completely sharp, so that the cut surfaces may be used directly as the outside face of the stone and subsequent working is not necessary.

In particular I use a cutting tool which is in the form of a band saw. It consists in a steel band guided over two pulleys and having its cutting edge prepared in the aforesaid manner. Such a band withstands the cutting process in an unexpected manner although in running over the guide pulleys it is continuously bent backward and forward and the notches on the one side are thereby pressed together and on the other side drawn apart, and although the fixing of the diamond dust in the steel is more difficult than in soft sheet iron or tin plate.

In the accompanying drawings:—Figure 1 is a front elevation of a machine involving the invention; Fig. 2 is a fragmentary section of the tool or saw showing the disposition of the notches for receiving and holding the abrading material.

Movable on two vertical columns $a$ is a frame $b$, which carries two band pulleys $c$ and $d$ mounted on vertical axles. Around these pulleys $c$ and $d$ runs a cutting band $e$ which on its lower edge is provided with a series of closely spaced fine transverse notches $x$ to receive the diamond dust in the aforesaid manner. The pulley $d$ is driven through a shaft $f$ provided with a key from the bevel gear $g$ and the belt pulley $h$. The pulley $c$ can move axially on the shaft $f$ but rotates therewith. The whole frame $b$ is suspended on a screw spindle $i$ which works in a nut resting on the table $k$ and provided with a bevel gear wheel $j$. The latter is driven by a bevel wheel $l$ itself driven through a speed gear $m$ from the belt pulley $n$. There are three belt pulleys $n$, one serving for rotation in the right hand direction, the other for the rotation in the left hand direction, the third being a loose pulley. The band $e$ receives through the pulley $c$ the necessary movement from the belt pulley $h$; the progressive movement of the band is produced by correspondingly screwing down the spindle $i$ and with it the whole frame $b$.

Now what I claim and desire to secure by Letters Patent is the following:

1. A tool for making narrow smooth sided cuts in blocks of stone of non-homogeneous structure in respect of hardness having a narrow cutting edge provided with a multiplicity of closely spaced fine transverse notches and comminuted loose abrading material mixed with a binder anchored in said notches.

2. A tool for making narrow smooth sided cuts in blocks of stone of non-homogeneous structure in respect of hardness having a narrow cutting edge provided with a multiplicity of closely spaced fine notches and a mixture of diamond dust and oil filling said notches, the notches being partially closed to retain the mixture by upsetting the metal of the tool adjacent the edges of the notches.

In testimony that I claim the foregoing as my invention, I have signed my name in presence of two witnesses, this fifteenth day of September, 1911.

PAUL BURGER.

Witnesses:
CARL WIELE,
EVA SATTLER.